No. 863,966. PATENTED AUG. 20, 1907.
J. BILLETER.
ELECTROMAGNETICALLY OPERATED MECHANISM FOR REVERSING
THE MOTION OF MACHINE TOOLS.
APPLICATION FILED OCT. 25, 1906.
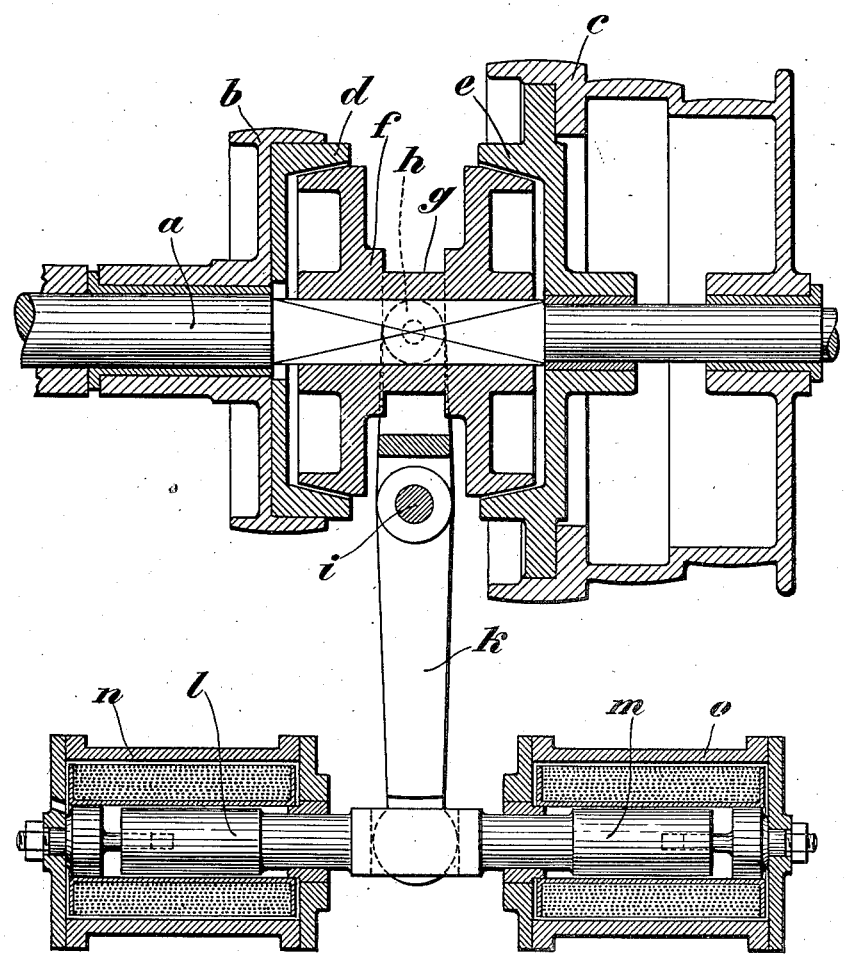
Witnesses:
Ger. Heinicke
J. Dittmar
Inventor.
Julius Billeter
by G. Dittmar
Attorney.

UNITED STATES PATENT OFFICE.

JULIUS BILLETER, OF ASCHERSLEBEN, GERMANY.

ELECTROMAGNETICALLY-OPERATED MECHANISM FOR REVERSING THE MOTION OF MACHINE-TOOLS.

No. 863,966.　　　　　Specification of Letters Patent.　　　Patented Aug. 20, 1907.

Application filed October 25, 1906. Serial No. 340,513.

*To all whom it may concern:*

Be it known that I, JULIUS BILLETER, a citizen of the German Empire, and a resident of 26ª Magdeburgerstrasse, Aschersleben, Prussia, Germany, factory manager, have invented a certain new and useful Improvement in Electromagnetically-Operated Mechanism for Reversing the Motion of Machine-Tools with To-and-Fro Moving Tables, of which the following is a specification, such as will enable others skilled in the art to which it appertains to make and use the same.

Mechanism for engaging and disengaging effected by means of electro-magnetically operated couplings has been already employed in large machine tools, such as planing machines and the like.

In comparison with the arrangements hitherto used for the engagement of the clutch or drum in which the changing of transmission straps is effected from the working table by means of a complicated steering mechanism, my invention has the great advantage that in planing machines for the control of the cutting tool, a step pulley can be employed so as to obtain any required speed, for the intermittent back travel of the table. The mechanism for the engagement of the drums of the coupling with electro magnetic action as hitherto known, is throughout performed in such a manner that the parts to be coupled, that is to say, the movable coupling clutch and one or other of the pulleys are immediately and firmly kept together by magnetic power, derived from an electromagnet or solenoid, the core of which draws the half clutch on to itself when the circuit is closed, and having thus effected a rigid connection between itself and the clutch, compels the latter to rotate with itself. The turning part to be coupled is at the same time either converted into an electromagnet itself or is combined with an electromagnet.

In consequence of this construction all arrangements of this kind hitherto known are weighted with the heavy disadvantage that they necessitate as a consequence of their continual rotation a complicated electric supply, which often causes failure in working and also that as the electric power directly engages with the clutch, an electric current of comparatively high intensity must be employed, in order to insure a sufficiently firm connection of the parts to be coupled.

The invention described herein relates to a mechanism for the engagement and disengagement of sheave-drums clutches or transmission pulleys for machine tools with to and fro moving working tables particularly for metal planing machines, which mechanism is controlled by electro magnets, and in which the supply of electricity is easily arranged, and the consumption of current considerably decreased, without at the same time weakening the firm connection of the coupling parts.

For this purpose I construct my mechanism in such a manner that the electromagnet power does not act directly on the parts to be coupled, but acts on the longer arm of an engaging lever, which forms an intermediate link, in such a manner that the latter, the movable clutch, engages alternately with the drum or pulley for the back travel of the table or with the step pulley for the operation of the cutting tool. These two drums or pulleys are suitably constructed as shown or in the manner of other well known friction clutches. As in couplings of this kind the clutch need only perform a very small movement in either direction, the relation of the lengths of the lever arms can be easily regulated in such a manner that, without too great travel of the long arm and at a most reduced consumption of electric current, the pressure on the parts to be coupled is effected, the power of which surpasses by far the power of attraction of the two solenoids, by which the lever is operated.

The accompanying drawings, show a longitudinal section of my improved mechanism applied in a planing machine with to and fro moving working table.

On the axle *a*, which is alternately driven in the one or the other direction, the pulleys or transmission disks *b*, and *c* are loosely mounted, of which disks one is driven by an open strap and the other by a crossed transmission strap, so that they rotate in opposite directions. As a shifting of the transmission straps is not necessary for the changing of the direction in which the axle *a* rotates, step pulleys can be employed for the straps which control the cutting tool for the purpose of obtaining different speeds, without at the same time necessitating the employment of special intermediate gearings. With the transmission disk or drum *b* and step pulley *c*, the coupling disks or clutches *d* and *e* are firmly connected. Between the latter, the coupling box or clutch *f* is arranged on the axle *a*, in such a manner that it can be moved but cannot perform an independent movement. The shorter arm of the engaging lever *k* which can be turned on the fixed bolt or shaft *i* engages with the ring groove *g* of the clutch *f*. The longer arm of the lever *k* is linked to the cores *l*, *m* of the fixed solenoids *n*, *o*, which are charged alternately with the current, so that the longer arm of the lever is drawn at one time to the right hand and at the other time to the left hand side by the cores *l* and *m*, alternately attracted by their surrounding wires. By this the coupling box or clutch *f* is coupled alternately with the drums or clutches *d* and *e* and thus rotated at one time in the direction of the movement of the one disk and at the other time in that of the other disk. The drums acting on the axle $a$ turn same in the same direction as they rotate themselves and the axle $a$ transfers its movement to the working table, causing the latter to move to and fro.

In order to charge the solenoids alternately, and in intervals corresponding to the travel of the working table, a switch may be suitably arranged on the frame of the working table, the lever of which switch is suitably arranged within reach of tappets movably arranged on the frame of the working table, and as usually employed for changing the direction of movement, so that these tappets after termination of one travel of the working table always turn the switch lever by counter stroke in such a manner, that at one time the solenoid $n$ and at the other time the solenoid $o$, is inserted into the circuit.

What I claim and desire to secure by Letters Patent is:—

In a reversing motion for shafts two oppositely driven belt pulleys loosely mounted on said shaft, friction dishes secured to said belt pulleys and facing each other, a double cone friction clutch slidably mounted on said shaft between said friction dishes and adapted to engage one or the other, a lever fulcrumed near the double cone having one end fork-shaped and adapted to engage said double cone and having its other end ball-shaped, two solenoids oppositely mounted near said ball-shaped end and a double core for said solenoids being slotted in the middle to engage the ball end of the lever, substantially as described.

In testimony whereof I affix my signature.

JULIUS BILLETER.

In the presence of—
R. KORSCH,
MARIA SCHNEIDER.